United States Patent [19]
Keating

[11] Patent Number: 5,963,859
[45] Date of Patent: Oct. 5, 1999

[54] WIRELESS COMMUNICATION DEVICE WITH REPLACEABLE BATTERY AND PREPAID CALLING TIME

[75] Inventor: William E. Keating, Bedford, Mass.

[73] Assignee: Polaroid Corporation, Cambridge, Mass.

[21] Appl. No.: 08/896,619

[22] Filed: Jul. 18, 1997

[51] Int. Cl.⁶ .......................... H04M 17/00; H04M 15/00; H04Q 7/20
[52] U.S. Cl. .......................... 455/405; 455/408; 455/406; 379/144
[58] Field of Search .................. 455/405, 406, 455/407, 408, 409, 90, 573, 550, 403, 343, 38.3, 410, 411, 38.4; 379/114, 143, 144, 111, 112, 113, 115

[56] References Cited

U.S. PATENT DOCUMENTS

| | | | |
|---|---|---|---|
| 5,138,650 | 8/1992 | Stahl et al. | 379/61 |
| 5,359,182 | 10/1994 | Schilling | 235/380 |
| 5,511,114 | 4/1996 | Stimson et al. | 379/114 |
| 5,541,985 | 7/1996 | Ishii et al. | 379/111 |
| 5,572,574 | 11/1996 | Barnes et al. | |
| 5,577,100 | 11/1996 | McGregor et al. | 379/58 |
| 5,621,787 | 4/1997 | McKoy et al. | 379/144 |
| 5,797,101 | 8/1998 | Osmani et al. | 455/405 |
| 5,845,218 | 12/1998 | Altschul | 455/407 |
| 5,850,599 | 12/1998 | Seiderman | 455/404 |
| 5,870,459 | 2/1999 | Phillips et al. | 455/406 |

FOREIGN PATENT DOCUMENTS

| | | |
|---|---|---|
| A2262685 | 6/1993 | United Kingdom . |
| WO96/03001 | 2/1996 | WIPO . |

*Primary Examiner*—Reinhard J. Eisenzopf
*Assistant Examiner*—Edan Orgad
*Attorney, Agent, or Firm*—Barry Gaiman; Wolfgang Stutius

[57] ABSTRACT

A wireless communication device is provided which is capable of interfacing with a base station of a service provider and intended for occasional use without requiring a subscription with the service provider. The device uses a non-rechargeable replaceable power source with memory means non-detachably secured to and integral with said power source comprising information code for uniquely identifying said power means and a prepaid calling time period. After the prepaid calling time period of the wireless communication device is exhausted, the power source can be exchanged for a different power source having a new prepaid calling time period.

9 Claims, 4 Drawing Sheets

WIRELESS COMMUNICATION DEVICE WITH REPLACEABLE BATTERY AND PREPAID CALLING TIME

BACKGROUND OF THE INVENTION

1. Field of the Invention

This invention relates to a wireless communication device capable of interfacing with a base station of a service provider and intended for occasional use without requiring a subscription with the service provider. The device of the invention is particularly adapted to use a non-rechargeable replaceable battery having associated therewith an encoded identification code which includes payment information, such as prepayment of a certain calling time and/or an ID code for account tracking purposes.

2. Description of Related Art

Conventionally, wireless communication devices are set up to communicate with the ground stations operated by a service provider selected by the subscriber by entering into a long-term contractual relationship with the service provider extending over a time period of not less than usually one year. Cancellation of the service agreement prior to the time period agreed to will result in substantial monetary penalties. In addition, the subscriber is assigned a telephone number having commonly the same area code as the wireline telephone service provided to the subscriber's residence or business. This telephone number and other ID codes associated with the wireless communication device allow the subscriber to initiate and to receive telephone calls from any subscriber connected to the public switched telephone network (PSTN).

Although a large number of subscribers to the wireless phone service will use their device for both initiating and receiving calls and therefore require a conventional telephone number, there are other subscribers and many potential subscribers who may want to use their wireless communication device only occasionally or for emergencies and do not intend to receive incoming calls. These other subscribers may agree to a one time purchase of a wireless communication device at a reasonable cost and may subsequently want to purchase a certain amount of prepaid calling time, for example in the form of a certain number of time units, for just such occasional use.

In addition, wireless communication devices almost exclusively use rechargeable batteries to provide power to the device. Rechargeable batteries are known to provide the relatively large current required for transmitting signals, but are also known for not being able to retain their charge over extended periods of time. In a wireless communication device intended for occasional use, it could therefore be anticipated that the subscriber may not be diligent in maintaining the rechargeable battery in its charged state, thereby preventing the wireless phone from operating properly when needed.

Emergency wireless phones and wireless phones with a limited calling time are known in the art. WO 96/03001, for example, shows a wireless phone wherein removal of a sealing means allows the phone to be switched on and the simultaneous transmission of an ID code to the telephone exchange enables access to a predetermined telephone line for a restricted period of time. The user does not need a subscription contract. U.S. Pat. No. 5,138,650 shows a wireless phone having memory means for storing a credit balance prior to usage of the phone and means for updating the credit balance. The phone can be used as long as there remains a credit balance. GB A 2 262 685 describes a wireless phone device where radio transmission from the device can be terminated either by receiving a remote termination signal or after a predetermined length of time which is determined at the time of purchase of the device or its manufacture.

The wireless communication devices described above are either intended to be disposable after expiration of the preprogrammed connect time which is rather expensive considering the manufacturing cost of a wireless communication device, or the accounting data are managed and updated by the service provider. Therefore, there is a need for a wireless communication device for occasional use which can be purchased and operated reliably and inexpensively and which does not require a subscription contract to be in force with a service provider at all times.

It is therefore an object of the invention to provide a wireless communication device with a non-rechargeable replaceable battery with an extended shelf-life and an adequate battery capacity which exceeds a certain predetermined, preferably prepaid calling time. It is a further object of the invention to have a unique ID number assigned to the battery which can be processed by a service provider and indicates a prepaid amount of calling time. The usage of the phone is allowed as long as there is a credit remaining for the unique ID number; a new battery with a different unique ID number can be inserted into the wireless communication device to continue the call or to initiate other calls.

BRIEF DESCRIPTION OF THE DRAWINGS

Other objects and attainments together with a fuller understanding of the invention will become apparent and appreciated by referring to the following description and claims taken in conjunction with the accompanying drawings.

In the drawings is shown in.

DESCRIPTION OF THE PREFERRED EMBODIMENTS

Figure 2:
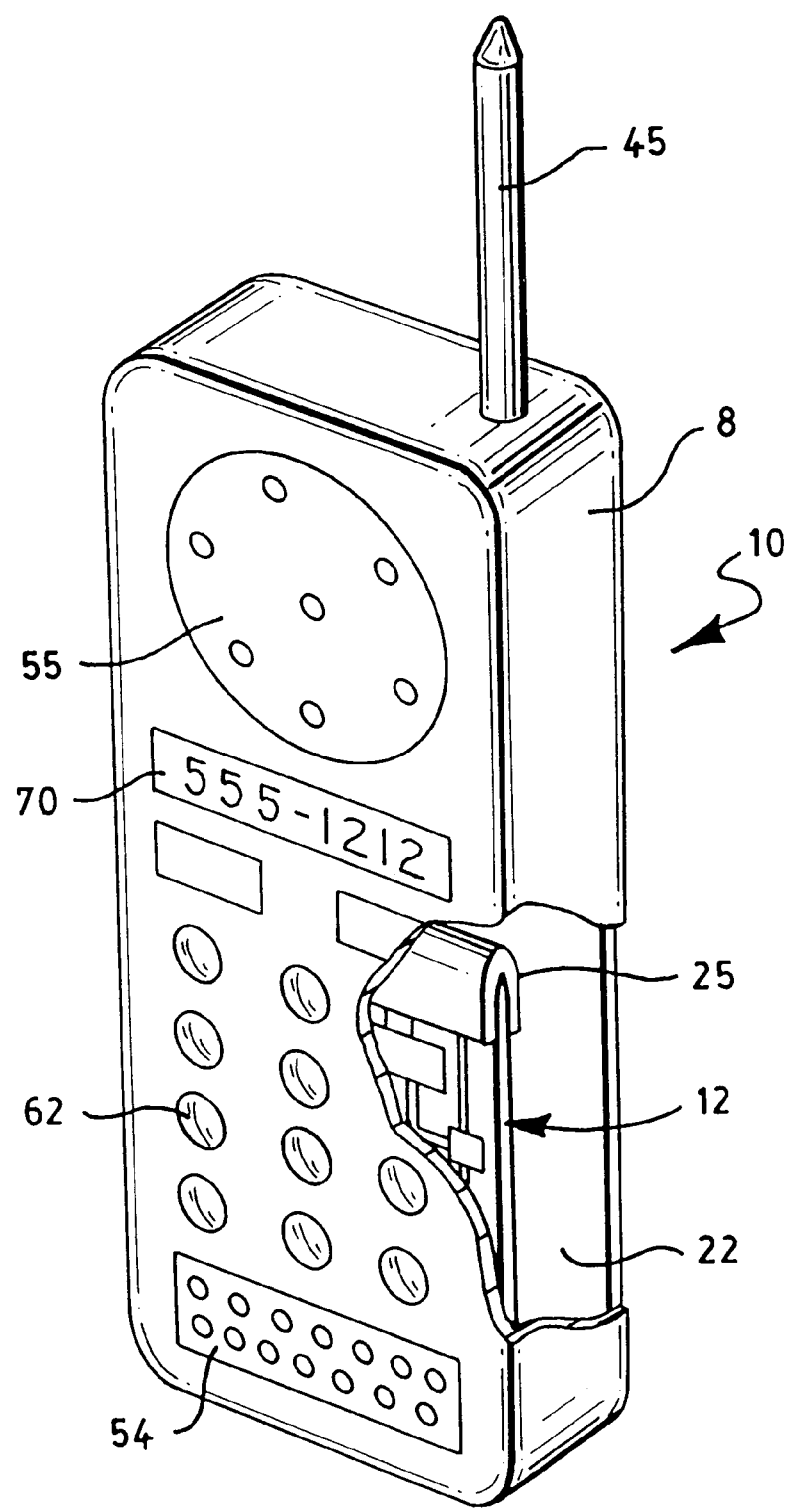
FIG. 2 a partial sectional view of a wireless communication device adapted to cooperate with the power source of FIG. 1.
Figure 3:
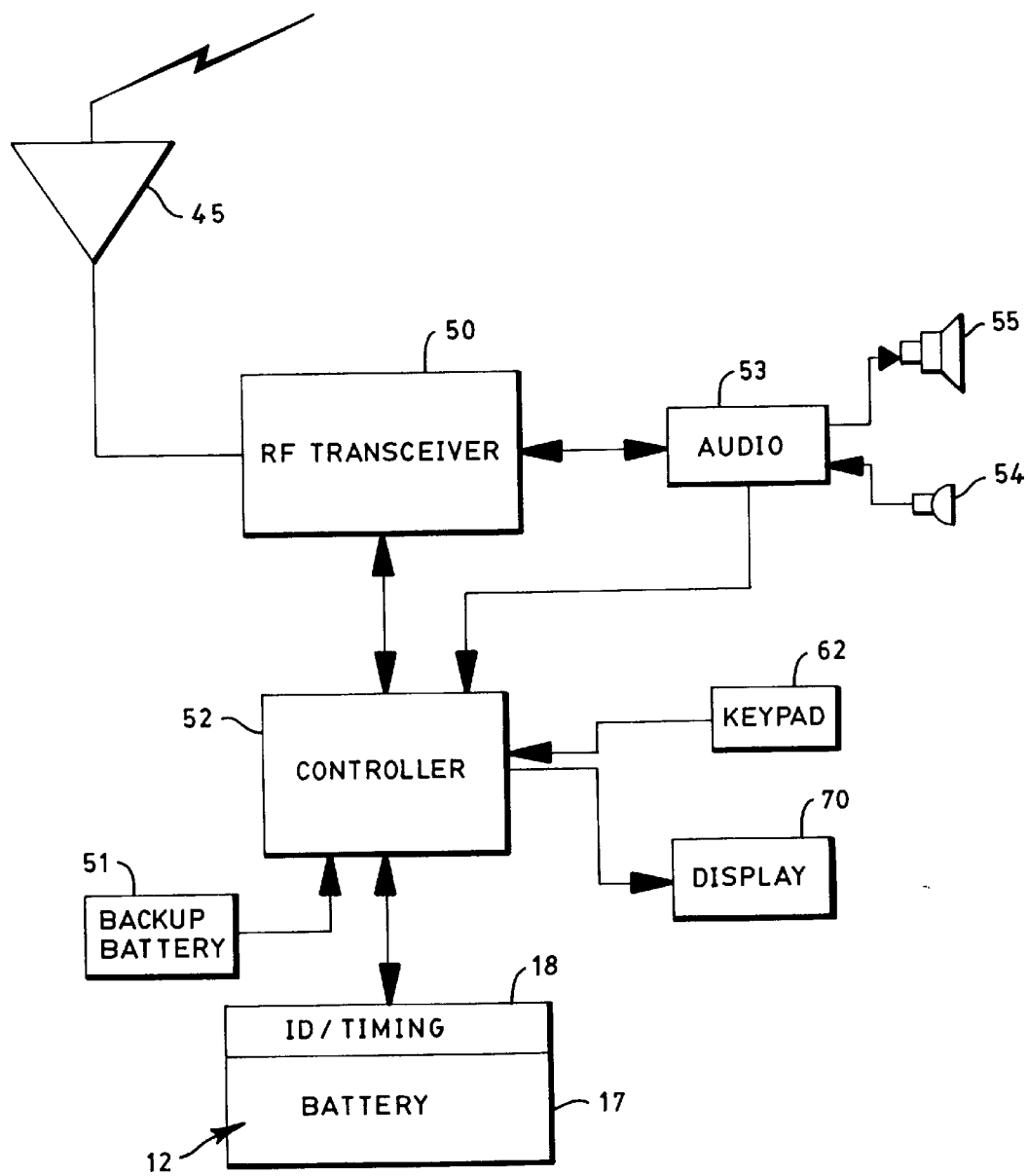
FIG. 3 a schematic block diagram of the wireless phone incorporating the power source of FIG. 1.

Referring now first to FIGS. 2 and 3, there is depicted a wireless communication device 10 which includes a housing 8 to which an antenna 45 is attached for receiving and transmitting radio signals to a base station (not shown). The wireless communication device 10 further includes a conventional RF transceiver 50 connected to an audio section 53 which is connected to an ear phone 55 and to a microphone 54. The RF transceiver 50 is also connected to a controller 52 which handles input/output functions, such as interfacing with a keypad 62 and a display 70. The RF transceiver 50 may also interface directly with the audio section 53, for example, in order the announce status information about the wireless communication device 10 via the ear phone 55.

In a conventional wireless communication device, the identification code of the device and/or the telephone number assigned to the device as well as other relevant registration data are usually stored in an EEPROM embedded in or associated with the controller 52. The conventional wireless communication device is ready to operate after power is applied, for example, by connecting a rechargeable battery. In the wireless communication device 10 of the invention, on the other hand, the controller 52 does not store all of the necessary information for establishing an information communication channel and therefore does not allow a user to connect to the network of a service provider by simply applying power to the device 10. On the contrary, the wireless communication device of the invention requires an integrated power source 12 which includes not only a battery 17, but more importantly storage means 18, such as a semiconductor chip or another read- and write-enabled memory device, wherein the storage means 18 contains a unique information code allowing the user to initiate a radio telephone call of limited duration by inserting the power source 12 in the wireless communication device 10.

Figure 1:
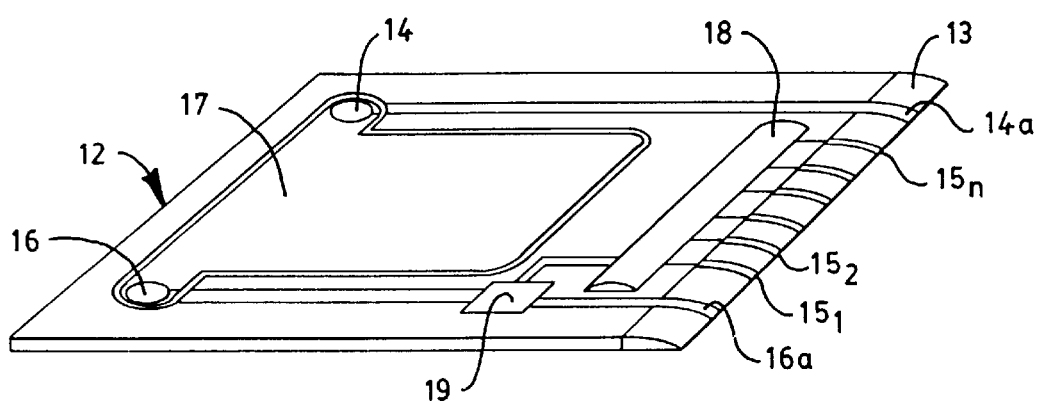
FIG. 1 a power source for operating a wireless communication device of the invention incorporating identification and accounting means.

An embodiment of the power source 12 is shown in FIG. 1. The battery 17 of the power source 12 has two terminals 14, 16 which transmit power to two terminals 14a, 16a located on a connector adapted to mate with a receptacle 25 of the wireless communication device 10. The memory means 18 of the power source 12 preferably forms an integral part with the of the power source 12 and has I/O connections (not shown) connected to terminals $15_1$, $15_2$, ..., $15_n$, on the connector 13. The memory means 18 may also be capable of interrupting the flow of power, via a switching means 19 interposed between at least one of the battery terminals 14, 16 and the respective one of the terminals 14a, 16a, as shown schematically in FIG. 1.

According to the invention, the wireless communication device 10 is provided with a receptacle 25 mating with the connector 13 for providing the electrical power from the battery 17 to the device 10 and for conveying identification codes, including possible information with respect to the remaining prepaid calling time to be transmitted to the service provide. Although the power source 12 is shown in FIG. 3 to be connected to the controller 52, it could alternately be connected to any other component in the wireless communication device 10 capable of accepting power and processing the ID codes and other information.

The integral power source 12 is preferably formed by joining the battery 17, the memory means 18, the optional switching means 19 and the connector 13 joined in a sealed tamperproof enclosure. The memory means 18 may contain a read-only memory portion for storing the unique identification code of the battery as well as the amount of the initial prepaid calling time purchased by the user. The memory means 18 may further contain a rewritable memory portion for tracking and/or updating the remaining calling time, wherein the rewritable memory could either be tracked and/or updated in the power source 12 itself through an internal clock without communicating information about the remaining calling time to the service provider, or through communication with the service provider. At the point of sale of the power source 12, the user may be able to select a specific service provider which is then reflected in the ID code pre-written and stored in the memory means 18, or the user may be able to select a service provider when the first call with a new power source 12 is initiated. The invention has the advantage that the possibility for misuse or fraud is reduced, since the calling time has already been prepaid and the total accumulated calling time with a given power source 12 is limited to the prepaid calling time which could also be substantially equal to the charge capacity of the battery 17.

Figure 4:
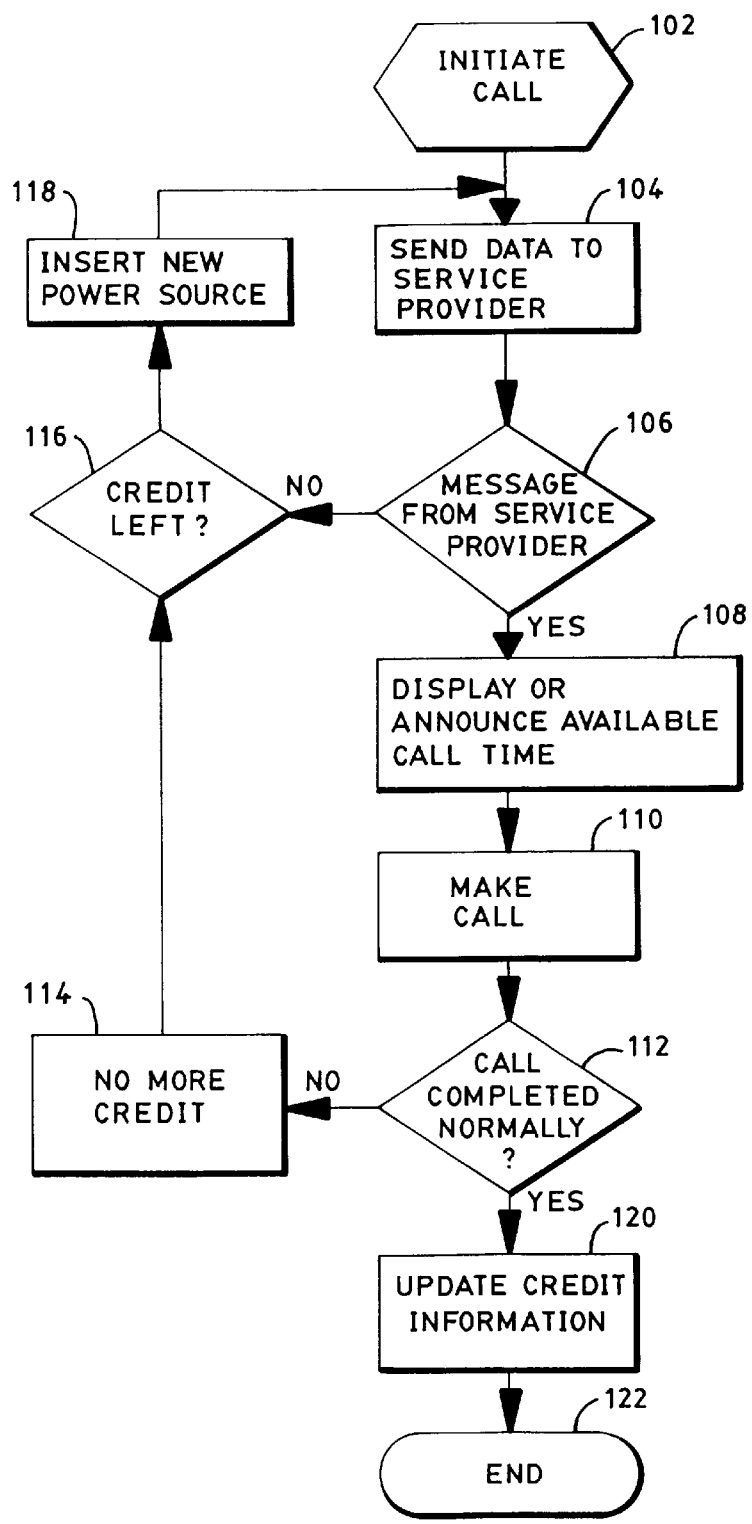
FIG. 4 a flow diagram depicting the sequence of calling steps.

The operation of the wireless communication device 10 of the invention is best understood from the flow diagram depicted in FIG. 4. In the following embodiment, it will be assumed that a specific service provider has been preselected. With the power source 12 connected to the device 10, the user initiates a call in step 102 by using keys of keypad 62, for example the SEND key. In step 104, data stored in the memory means 18, for example the ID code of the power source 12 and information about the calling time balance, are communicated to the service provider. If these data are valid, the service provider sends a message to the wireless communication device 10 enabling the initiated call to proceed. If these data are not valid, then the service provider will either not respond or will send a message that the call is not allowed.

If the call cannot proceed, the user may be able to check the remaining calling time balance either via display 70 or the balance may be announced by audio signals via ear phone 55. In this situation, the calling time balance will most likely be zero and the user will have to insert a new power source 12 and initiate a new call in step 102.

If the call is allowed to proceed in step 106, the remaining calling time balance may be communicated to the user in the manner described above and the call is set up in step 110. At step 112, the call can terminate in two ways. If the call is shorter than the remaining calling time balance, then the call is completed normally, the calling time balance is updated in step 120, either in a self-contained mode, by updating the balance in the memory means 18 without communicating balance information to and/or receiving balance information from the service provider, or the calling time balance is updated at the end of the call by a signal from the service provider.

If the duration of the call approached the remaining calling time balance, then the user will be notified in step 114, preferably by an audio message generated in the wireless communication device 10, and advised to insert a new power source 12 with a sufficient calling time balance and to redial the call. Alternatively, a backup battery 51 could be incorporated the wireless communication device 10 as a backup to permit changing the power source 12 within a certain short time without losing the radio connection.

As noted above, the wireless communication device 10 does not require a standard telephone number since the device 10 is not intended to receive incoming telephone calls. Consequently, the ID code is not restricted to a combination of 10 numbers, as is customary, for example, in the USA. According to the Common Air Interface (CAI) protocol, the ID number may contain up to 64 bits which could easily accommodate the projected number of single use power sources 12 of the invention, wherein each ID number is used only once.

While there have been described what at present are considered to be the preferred embodiments of the present invention, it will be readily apparent to those skilled in the art that various changes may be made therein without departing from the invention, and it is intended in the claims to cover such changes and modifications as fall within the true spirit and scope of the invention.

What is claimed:

1. A wireless communication device capable of interfacing with a wireless telephone network of a service provider without requiring a subscription with the service provider, the wireless communication device comprising:

communication means for transmitting information of intelligence to and receiving such information from the wireless telephone network; and removable power means adapted to be connected to said wireless communication device for providing electrical power to said communication means, said power means comprising:

a battery;

memory means non-detachably secured to and integral with said battery and comprising information code for uniquely identifying said power means and a prepaid calling time period;

wherein the wireless communication device can interface with the wireless telephone network as long as the accumulated calling time is less than the prepaid calling time period, whereafter the wireless communication device can be reused after connecting new removable power means thereto.

2. The wireless communication device of claim 1, wherein said information code is different from a valid telephone number of a public telephone network.

3. The wireless communication device of claim 1, wherein said battery is not rechargeable.

4. The wireless communication device of claim 3, wherein said battery is capable of providing power to said communication means for a time period which is not significantly longer than the duration of the prepaid calling time period.

5. The wireless communication device of claim 1, wherein the service provider is selected when the power means is purchased.

6. The wireless communication device of claim 1, wherein the memory means further comprises updating means for tracking and updating the accumulated calling time without requiring communication with the service provider.

7. The wireless communication device of claim 6, wherein the power means further comprises switching means connected in series with the battery and activated by said memory means for disconnecting the power to said communication means when the accumulated calling time exceeds the prepaid calling time period.

8. The wireless communication device of claim 1 further comprising a backup battery for supplying electrical power to said communication means for allowing the wireless communication device to remain connected to the wireless telephone network for a certain period of time during which time the power source in the wireless communication device can be exchanged for a different power source having a new prepaid calling time period.

9. A method for allowing a user to initiate a radio telephone call from a wireless communication device capable of interfacing with a wireless telephone network of a service provider without requiring a subscription with the service provider, said wireless communication device adapted to receive electrical power from removable power means which include a battery and memory means for storing a prepaid calling time period, the method comprising the steps of:

a) establishing a call connection to the wireless network and allowing said call connection to continue until the accumulated calling time exceeds the prepaid calling time period;

b) alerting the user when the accumulated calling time exceeds the prepaid calling time period; and c) prompting the user to insert new power means which includes a new prepaid calling time period, in order to continue said connected call or to establish a new call connection.

\* \* \* \* \*